(12) United States Patent
Lamash et al.

(10) Patent No.: US 9,595,079 B2
(45) Date of Patent: Mar. 14, 2017

(54) HIGH RESOLUTION VOLUMETRIC IMAGE GENERATION BASED ON SUPER RESOLUTION POST-PROCESSING AND POINT SPREAD FUNCTION

(71) Applicant: KONINKLIJKE PHILIPS N.V., Eindhoven (NL)

(72) Inventors: Yechiel Lamash, Haifa (IL); Liran Goshen, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 32 days.

(21) Appl. No.: 14/376,856

(22) PCT Filed: Jan. 30, 2013

(86) PCT No.: PCT/IB2013/050785
§ 371 (c)(1),
(2) Date: Aug. 6, 2014

(87) PCT Pub. No.: WO2013/121312
PCT Pub. Date: Aug. 22, 2013

(65) Prior Publication Data
US 2014/0376795 A1 Dec. 25, 2014

Related U.S. Application Data

(60) Provisional application No. 61/598,366, filed on Feb. 14, 2012.

(51) Int. Cl.
*G06K 9/00* (2006.01)
*G06T 3/40* (2006.01)
(Continued)

(52) U.S. Cl.
CPC .......... *G06T 3/4053* (2013.01); *G06T 3/0068* (2013.01); *G06T 11/003* (2013.01)

(58) Field of Classification Search
CPC .... G06T 11/003; G06T 3/0068; G06T 3/4053
See application file for complete search history.

(56) References Cited

U.S. PATENT DOCUMENTS 5,696,848 A * 12/1997 Patti ...................... G06T 3/4053
348/E5.062
6,718,004 B2 4/2004 Cesmeli
(Continued)

FOREIGN PATENT DOCUMENTS

JP  2005095329     4/2005
WO  2011037853 A1  3/2011

OTHER PUBLICATIONS

Markl, Michael, and Jürgen Hennig. "Phase contrast MRI with improved temporal resolution by view sharing: k-space related velocity mapping properties." Magnetic resonance imaging 19.5 (2001): 669-676.*

(Continued)

*Primary Examiner* — Nirav G Patel

(57) ABSTRACT

In one aspect, a method for generating higher resolution volumetric image data from lower resolution volumetric image data includes receiving volumetric image data of a scanned subject, wherein the volumetric image data includes data representing a periodically moving structure of interest of the scanned subject, and wherein the volumetric image data covers multiple motion cycles of the periodically moving structure of interest. The method further includes estimating inter-image motion between neighboring images of the received volumetric image data. The method further includes registering the received volumetric image data based at least on the estimated inter-image motion. The method further includes generating the higher resolution volumetric image data based on the registered volumetric image data, a super resolution post-processing algorithm, and a point spread function of an imaging system that (Continued)

Figure 1:
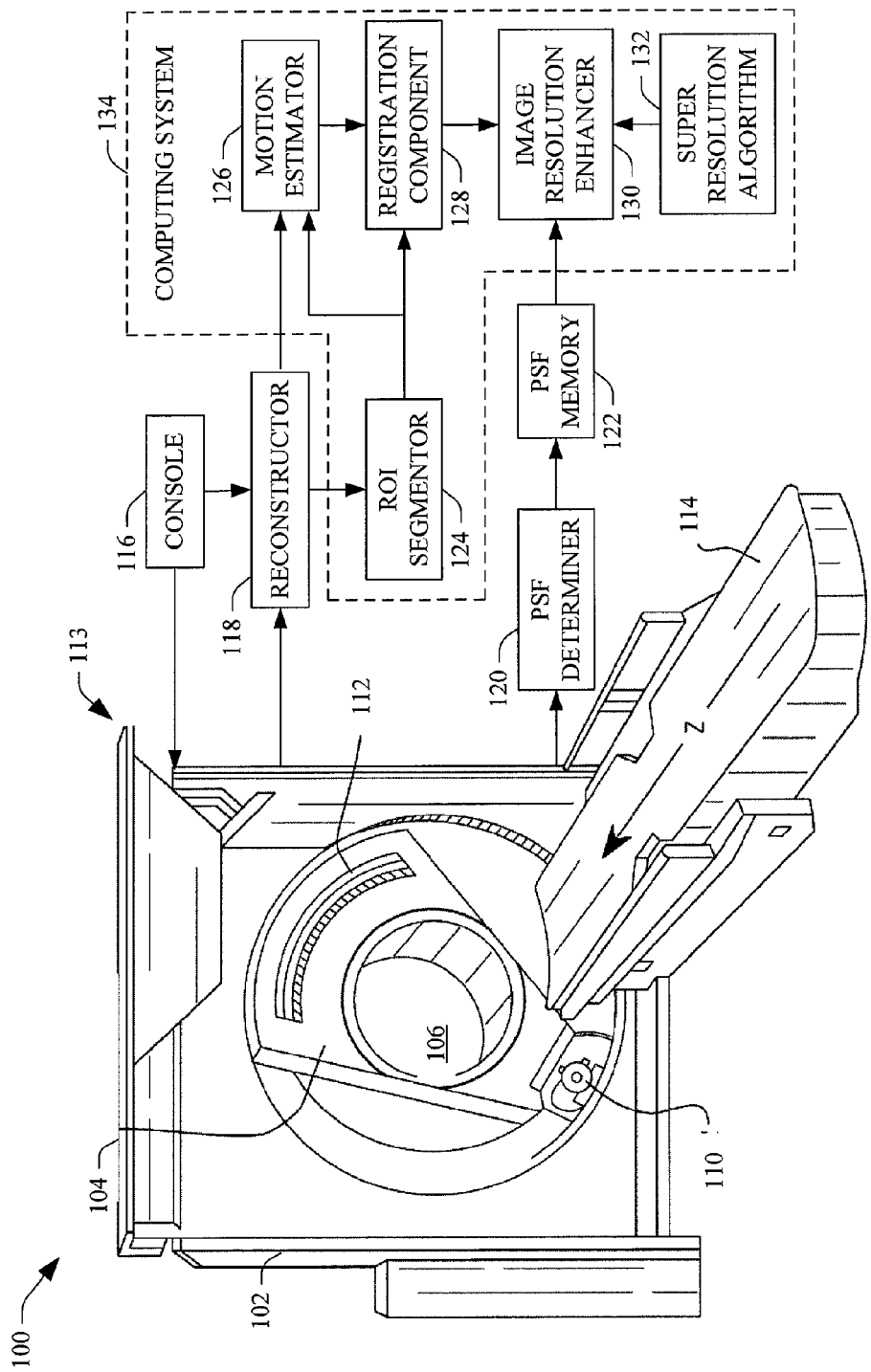

generated the volumetric image data. The higher resolution volumetric image data has an image resolution that is greater than the lower resolution volumetric image data.

20 Claims, 2 Drawing Sheets

(51) Int. Cl.
G06T 3/00 (2006.01)
G06T 11/00 (2006.01)

(56) References Cited

U.S. PATENT DOCUMENTS

| | | | |
|---|---|---|---|
| 7,526,063 B2 | 4/2009 | Boing et al. | |
| 7,630,528 B2 | 12/2009 | Kohler | |
| 7,653,172 B2 | 1/2010 | Harer et al. | |
| 7,924,972 B2 | 4/2011 | Koehler et al. | |
| 8,027,526 B2 | 9/2011 | Boese et al. | |
| 2005/0002546 A1* | 1/2005 | Florent | A61B 19/52 382/128 |

OTHER PUBLICATIONS

Amer, Aishy. "Memory-based spatio-temporal real-time object segmentation for video surveillance." Electronic Imaging 2003. International Society for Optics and Photonics, 2003.*
Orozco, Maria-Carolina Vanegas, Sébastien Gorges, and Jérémie Pescatore. "Respiratory liver motion tracking during transcatheter procedures using guidewire detection." International Journal of Computer Assisted Radiology and Surgery 3.1-2 (2008): 79-83.*
Borman, S., et al.; Spatial Resolution Enhancement of Low-Resolution Image Sequences: A Comprehensive Review with Directions for Future Research; 1998; pp. 1-64 downloaded from internet http://www.seanborman.com/publications.
Borman, S., et al.; Super-Resolution from Image Sequences—A Review; 1999; Circuits and Systems; pp. 374-378.
Bose, N. K., et al.; Recursive Implementation of Total Least Squares Algorithm for Image Reconstruction From Noisy, Undersampled Multiframes; 1993; IEEE Conf. on Acoustics, Speech and Signal Processing; vol. 5:269-272.
Chiang, M.C., et al.; Efficient Super-Resolution via Image Warping; 2000; Image and Vision Computing; 18:761-771.
Diehl, N.; Object-Oriented Motion Estimation and Segmentation in Image Sequences; 1991; Signal Processing: Image Communications; 3:23-56.
Elad, M., et al.; A Fast Super-Resolution Reconstruction Algorithm for Pure Translation Motion and Common Space-Invariant Blur; 2001; IEEE Trans. on Image Processing; 10:1187-1193.
Fischer, B., et al.; Ill-posed medicine—an introduction to image registration; 2008; Inverse Problems; 24:1-16.
Goshtasby, A. A.; 2-D and 3-D Image Registration for Medical, Remote Sensing, and Industrial Applications; 2005; John Wiley; 258 pages.
Grangeat, P., et al.; Theoretical framework for a dynamic cone-beam reconstruction algorithm based on a dynamic particle model; 2002; Phys. Med. Biol.; 47:2611-2625.
Hoffmann, M. H. K. et al.; Automatic determination of minimal cardiac motion phases for computed tomography imaging: initial experience; 2006; Eur. Radiol.; 16:365-373.
Irani, M., et al.; Improving Resolution by Image Registration; 1991; Graphical Models and Image Processing;53(3) 231-239.
Irani, M., et al.; Super Resolution from Image Sequences; 1990; Proc. Pattern Recognition; 2:115-120.
Kabus, S., et al.; B-Spline Registration of 3D Images with Levenberg-Marquardt Optimization; 2004; Proc. SPIE; pp. 304-313.
Kabus, S., et al.; Variational Image Registration with Local Properties; 2006; Biomedical Image Registration; pp. 92-100.
Kawasaki, T., et al.; Prediction of acute coronary syndrome by using multislice computed tomography.—Can we predict the onset of acute coronary syndrome?; 2011; Circ J; 75(8)2013-2018.
Kirbas, C., et al.; A Review of Vessel Extraction Techniques and Algorithms; 2004; ACM Computing Surveys; 36:81-121.
Liang, Z., et al., Calcium De-blooming in Coronary CT Image; 2007; IEEE Trans. on Bioinformatics and Bioengineering; pp. 257-262.
Lloyd-Jones, D.; et al.; Executive Summary: Heart Disease and Stroke Statistics—2010 Update: A Report from the American Heart Association; 2010; Circulation; 121:948-954.
McInerney, T., et al.; A Dynamic Finite Element Surface Model for Segmentation and Tracking in Multidimensional Medical Images with Application to Cardiac 4D Image Analysis; 1995; Computerized Medical Imaging and Graphics; 19(1)69-83.
Naghavi, M., et al.; From Vulnerable Plaque to Vulnerable Patient; 2003; Circulation; 108:1664-1672.
Nguyen, N., et al.; A Computationally Efficient Superresolution Image Reconstruction Algorithm; 2001; IEEE Trans. on Image Processing; 10(4)573-583.
Opolski, M. P., et al.; CT evaluation of vulnerable plaque: noninvasive fortune-telling?;2011; Int. J. Cardiovasc. Imaging; pp. 1-2.
Patti, A. J., et al.; Superresolution Video Reconstruction with Arbitrary Sampling Lattices and Nonzero Aperture Time; 1997; IEEE Trans. on Image Processing; 6(8)1064-1076.
Peleg, S., et al.; Improving image resolution using subpixel motion; 1987; Pattern Recognition Letters; 5:223-226.
Rousseau, F., et al.; Registration-Based Approach for Reconstruction of High-Resolution in Utero Fetal MR Brain Images; 2006; Acad. Radiol.; 13(9)1072-1081.
Rubio-Guivernau, J. L., et al.; Respiratory Motion Correction in PET with Super-Resolution Techniques and Non-Rigid Rigid Registration; 2007; IEEE Nuclear Science Symposium Conf. Record; M18-318; 3560-3563.
Teodosio, L., et al.; Salient Video Stills: Content and Context Preserved; 1993; Proc. First ACM Int'l Conf. on Multimedia; pp. 39-46.
Virmani, R., et al.; Pathology of the Vulnerable Plaque; 2006; J. Am. Coll. Cardiol.; 47(8)C13-C18.
Virmani, R., et al.; Lessons From Sudden Coronary Death: A Comprehensive Morphological Classification Scheme for Atherosclerotic Lesions; 2000; Arterioscler. Thromb. Vasc. Biol.; 20:1262-1275.
Wu, G., et al.; Estimating the 4D Respiratory Lung Motion by Spatiotemporal Registration and building Super-Resolution Image; 2011; MICCAI; Part I, LNCS 6891; pp. 532-539.
Zhang, H., et al.; Super-Resolution Reconstruction of Deformable Tissue from Temporal Sequence of Ultrasound Images; 2010; IEEE Conf. on Artificial Intelligence and Computational Intelligence; pp. 337-342.
Zitova, B., et al.; Image Registration Methods: a Survey; 2003; Image and Vision Computing; 21:977-1000.
Manzke, R., et al.; Automatic phase determination for retrospectively gated cardiac CT; 2004; Med. Phys.; 31(12) 3345-3362.
Ruan et al., "Three-dimensional motion and reconstruction of coronary arteries from biplane cineangiography", Image and Vision Computing, Elseview, vol. 12, No. 10, Dec. 1994.
Reinertsen, et al., "Validation of vessel-based registration for correction of brain shift", Medical Image Analysis, Jun. 2007.
Irani, et al., "Motion Analysis for Image Enhancement: Resolution, Occlusion and Transparency", Journal of Visual communication and Image Representation, vol. 4, No. 4, Dec. 31, 1993.

* cited by examiner

HIGH RESOLUTION VOLUMETRIC IMAGE GENERATION BASED ON SUPER RESOLUTION POST-PROCESSING AND POINT SPREAD FUNCTION

CROSS REFERENCE TO RELATED APPLICATIONS

This application is a national filing of PCT application Serial No. PCT/IB2013/050785, filed Jan. 30, 2013 published as WO 2013/121312 A1 on Aug. 23, 2013, which claims the benefit of U.S. provisional application Ser. No. 61/598,366 filed Feb. 14, 2012, which is incorporated herein by reference.

The following generally relates to enhancing image resolution and finds particular application to computed tomography (CT); however, it is also amenable to other imaging modalities such as magnetic resonance (MR), cardiovascular (CV), x-ray and/or other imaging modalities that acquire multiple frames of periodically moving structure of a subject or a scan of static structure of a subject from multiple different viewpoints.

The literature has indicated that coronary artery disease affects millions of people annually and accounts for many deaths every year. Complications from coronary artery disease include luminal narrowing (stenosis), occlusion of the coronary arteries, rupturing of vulnerable plaque, etc. A major clinical challenge for cardiologists, particularly those specializing in interventional cardiology, is the detection and prevention of acute myocardial infarction and other acute coronary syndromes. Histopathological studies have shown that the cause of sudden death from acute coronary syndromes is the presence of ruptured plaques. The literature has indicated that a trend has been to identify profiles of atherosclerotic lesions that are prone to rupture. Based on autopsy studies, a majority of culprit lesions are typically non-stenotic, contain a large necrotic core with a thin overlying fibrous cap, and induce expansive remodeling of the vascular segment.

Computed tomography (CT) is an imaging modality that generates diagnostic quality images of the interior of a subject such as periodically moving structure (e.g., the heart, lungs, etc.) and/or vessel (e.g., the coronary artery) of a subject. For the detection of atherosclerotic plaque and/or assessment of its composition and mechanical properties, the images generated from a CT scan should include data that accurately characterizes plaque. Unfortunately, current approaches to processing cardiac data may introduce artifact and, thus, may not accurately characterizes plaque. Examples of such artifact include blooming artifact (which results from hyper-dense objects such as calcified plaque), calcium blooming (which results primarily from the limited spatial resolution of the CT system) and/or other artifact can cause blurring, which results in an over-representation of the calcified regions, an under-estimation of the lumen area and the stenosis degree, blurring of intra-stent structures, blurring of the vessel and inaccurate characterization of plaque composition.

In view of the above, there is an unresolved need for other approaches for reducing patient dose while preserving image quality and/or improving image quality.

Aspects described herein address the above-referenced problems and others.

In one aspect, a method for generating higher resolution volumetric image data from lower resolution volumetric image data includes receiving volumetric image data of a scanned subject, wherein the volumetric image data includes data representing a periodically moving structure of interest of the scanned subject, and wherein the volumetric image data covers multiple motion cycles of the periodically moving structure of interest. The method further includes estimating inter-image motion between neighboring images of the received volumetric image data. The method further includes registering the received volumetric image data based at least on the estimated inter-image motion. The method further includes generating the higher resolution volumetric image data based on the registered volumetric image data, a super resolution post-processing algorithm, and a point spread function of an imaging system that generated the volumetric image data. The higher resolution volumetric image data has an image resolution that is greater than the lower resolution volumetric image data.

In another aspect, a computing system receives volumetric image data of a scanned subject, wherein the volumetric image data includes data representing a periodically moving structure of interest of the scanned subject, and wherein the volumetric image data covers multiple motion cycles of the periodically moving structure of interest. The computing system includes a motion estimator that estimates an inter-image motion between neighboring images of the received volumetric image data, a registration component registering the received volumetric image data based at least on the estimated inter-image motion, and an image enhancer that generates super resolution volumetric image data based on the registered volumetric image data and a point spread function of an imaging system that generated the volumetric image data. The super resolution image data for the periodically moving structure of interest has an image resolution that is greater than a resolution of the individual images of the received volumetric image data.

In another aspect, a method to identify plaque in a vessel includes generating a super-resolution image from a periodically moving object and characterizing plaque components from the super resolution images.

The invention may take form in various components and arrangements of components, and in various steps and arrangements of steps. The drawings are only for purposes of illustrating the preferred embodiments and are not to be construed as limiting the invention.

FIG. 1 schematically illustrates an example imaging system in connection with an image resolution enhancer.

Figure 2:
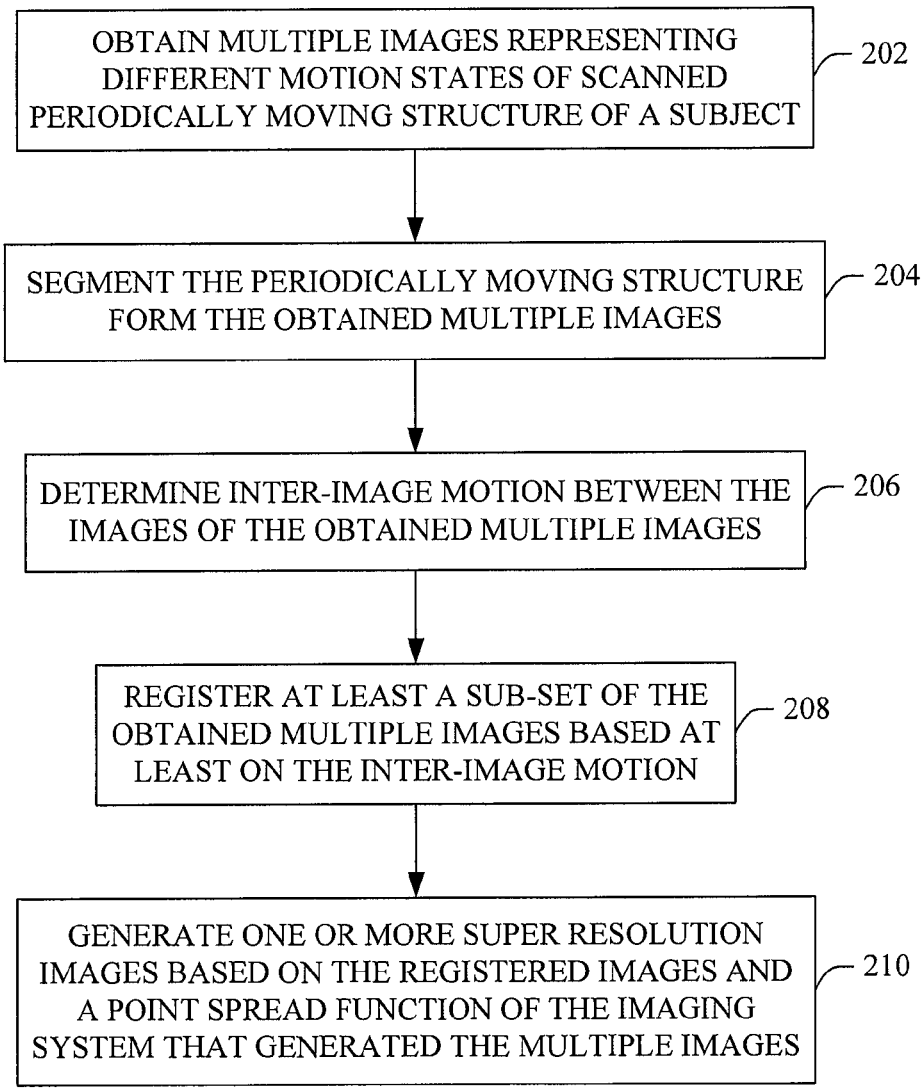

FIG. 2 illustrates an example method for enhancing the resolution of volumetric image data.

The following describes an approach for enhancing image resolution of volumetric image data using multiple reconstructions of a scanned periodically moving structure of interest of a subject by leveraging a redundancy of the acquired data of several motion phases to generate super resolution volumetric data of the structure of interest and/or related structure. The acquired data can be computed tomography (CT), magnetic resonance (MR), cardiovascular (CV), x-ray, and/or other imaging data of periodically moving structure (or static structure from multiple different viewpoints). For sake of brevity, the following is discussed in the context of CT.

Initially referring to FIG. 1, an imaging system 100 such as a CT scanner is schematically illustrated. The imaging system 100 includes a stationary gantry 102 and a rotating gantry 104, which is rotatably supported by the stationary gantry 102 and rotates around an examination region 106 about a z-axis. A radiation source 110, such as an x-ray tube, is supported by and rotates with the rotating gantry 104, and emits radiation that traverses the examination region 106. A radiation sensitive detector array 112 subtends an angular arc opposite the radiation source 110 across the examination region 106, detects radiation traversing the examination region 106, and generates a signal data indicative thereof. The radiation sensitive detector array 112 includes a one or two-dimensional array of the radiation sensitive detector pixels. The components 102 to 112 can be considered in aggregation as part of an imaging data acquisition and processing system 113.

The imaging system 100 further includes a subject support 114, such as a couch, supports a subject in the examination region 106. The subject support 114 is configured to move vertically and/or horizontally before, during, and/or after a scan of structure such as periodically moving structure to position the subject or object in connection with the system 100. The imaging system 100 further includes a general-purpose computing system or computer serves as an operator console 116. The console 116 includes a human readable output device such as a monitor or display and an input device such as a keyboard, mouse, etc. Software resident on the console 116 allows the operator to interact with the scanner 100 via a graphical user interface (GUI) or otherwise. This interaction may include selecting an imaging protocol (e.g., for a periodically moving structure of interest), initiating scanning, selecting post-processing of interest, etc.

A reconstructor 118 reconstructs the signal, generating several images indicative of the scanned structure. Where the structure includes a periodically moving organ such as the heart, lungs, etc., two or more of the images may respectively represent different phases of the motion. For instance, where the structure is the heart, one of the images may capture the systolic phase of the cardiac cycle while another image may capture the diastolic phase of the cardiac cycle. In another instance, where the structure includes the lungs, one of the images may capture the inspiration phase of the respiratory cycle while another image may capture the expiration phase of the respiratory cycle. Yet in another instance, where the structure includes structure that moves along with the cardiac and/or respiratory cycles, one of the images may capture the different motion phases of the structure. The reconstruction can be a retrospective or a prospective motion gated-reconstruction. The illustrated reconstructor 118 may or may not be part of the imaging system 100.

A point spread function (PSF) determiner 120 determines a point spread function for the imaging system 100 for one or more acquisition protocols of the imaging system 100. Generally, a point spread function (or an impulse response) describes the response (or blur) of the imaging system 100 to a point source, and the degree of spreading (blurring) of the point source is a quality measure of the imaging system 100. A point spread function can be determined by scanning a wire phantom, which simulates an impulse function, and the resulting blurring represents the systems point spread function. One or more point spread functions of the system 100 for different imaging protocols and determined by the point spread function determiner 120 and/or other component can be stored in PSF memory 122, which can be local and/or remote to one or more of the components of FIG. 1.

A region of interest (ROI) segmentor 124 segments one or more ROIs from the reconstructed volumetric image data. Suitable segmentation approaches include pattern recognition, model-based, tracking-based, artificial intelligence, neural network, tube-like object detection, and/or other approaches. Such approaches are discussed at least in C. Kirbas and F. Quek, "A review of vessel extraction techniques and algorithms," *ACM Computing Surveys*, vol. 36, pp. 81-121, 2004. Where the ROI corresponds to a particular vessel in one or more different motion states represented in the reconstructed volumetric image data, the ROI segmentor 124 facilitates segmenting the vessel from the reconstructed volumetric image data. Generally, vessel extraction in cardiac analysis allows the detection and labeling of different blood vessels surrounding the heart. As discussed in greater detail below, the segmented ROI of the volumetric image data can be utilized for motion estimation and/or image registration.

A motion estimator 126 estimates inter-image motion between the images of the reconstructed volumetric image data. Various approaches can be employed. For example, an ECG signal synchronized with the reconstructed images can be used to characterize the motion, for example, to identify "quiet" phases and/or other phases of the cardiac cycle. For this, the inter-image motion can be determined by comparing the similarity between consecutive images and/or otherwise. An example of this is discussed in R. Manzke, T. Köhler, T. Nielsen, D. Hawkes and M. Grass, "Automatic phase determination for retrospectively gated cardiac CT," *Med. Phys.*, vol. 31, pp. 3345, 2004. Another approach includes comparing a shape of a structure in an image to an expected shape of the structure in a known reference phase. The segmented ROI may be utilized to bound the data space (e.g., from the entire volume data set to a subset thereof), facilitate identifying a shape of a structure, provide location information which can be used to identify the structure, and/or otherwise be used.

A registration component 128 registers images of the reconstructed volumetric image data based at least on inter-image motion. Suitable registration approaches include rigid and/or non-rigid approaches. In one instance, a local rigid/affine transformation is used to describe a global, non-rigid deformation. The solution space might be explicitly given or implicitly determined by a variational formulation. Spline-based registration can be used for non-rigid image registration. With B-splines, a displacement of a control point results in a displacement of the surrounding voxels only. Based on the transformation and on the choice of the similarity measure, an objective functional to be minimized can be defined.

In addition, approximation or scale-space ideas are used for convexification of the objective function. Regularizations can be used to incorporate user knowledge into the registration. Generally, regularization in image registration is on the existence rather than on the uniqueness of the underlying optimization problem. Priors, masks and/or penalties can be used to avoid unrealistic solutions. A prior can be derived from manual, model based or other organ segmentation. In order to facilitate the convergence to the global minimum and accurately discover a location of a pixel, a scale space approach combined with prior knowledge derived from model-based segmentation can be used.

Examples of suitable registration approaches can be found at least in B. Zitova and J. Flusser, "Image registration methods: a survey," *Image Vision Comput.*, vol. 21, pp. 977-1000, 2003, A. Goshtasby, *2-D and 3-D Image Registration for Medical, Remote Sensing, and Industrial Applications*. Wiley-Interscience, 2005. B. Fischer and J. Modersitzki, "Ill-posed medicinean introduction to image registration," Inverse Problems, vol. 24, pp. 034008, 2008, S. Kabus, A. Franz and B. Fischer, "Variational image registration with local properties," *Biomedical Image Registration*, pp. 92-100, 2006, and S. Kabus, T. Netsch, B. Fischer and J. Modersitzki, "B-spline registration of 3D images with levenberg-marquardt optimization," in *Proceedings of the SPIE*, 2004, pp. 304-313.

The motion estimates can be used to identify a sub-set of images to register. For example, where the motion between an image of a motion phase of interest and one or more neighboring images are within a predetermined motion threshold range, the images of the motion phases of interest and the one or more neighboring images are included as part of the sub-set. However, where one or more neighboring images are outside of the predetermined motion threshold range, those neighboring images are excluded from the sub-set. The segmented ROI of the reconstructed volumetric image data can be used to bound the data space (e.g., from the entire data set to a subset thereof), provide prior knowledge for assigning different weights or masking for different voxels of interest to visually enhance structure of interest, close gaps where initial motion is too large, etc.

An image resolution enhancer 130 enhances the resolution of one or more images based on a super-resolution algorithm 132 and a PSF of the imaging system 100, which can be obtained from the PSF determiner 120, PSF memory 122 and/or other component. Suitable super-resolution approaches include frequency and/or spatial domain approach. Frequency domain approaches are generally simple and computationally cheap. However, they are by definition suitable for pure translational motion and are extremely sensitive to model errors. Spatial domain approaches are generally computationally more expensive. However, they are not limited to translation motions and therefore may be more appropriate for certain structure motion such as cardiac motion. The PSF can be used to adjust the images for blur due to the imaging system 100.

The following provides a non-limiting example of a suitable iterative super resolution algorithm. Given K low resolution images $g_k$, a higher resolution image f can be restored as shown by the iterative image update algorithm of EQUATION 1:

$$f^{(n+1)} = f^{(n)} + \frac{1}{K}\sum_{k=1}^{K} T_k^{-1}(((g_k - g_k^{(n)})\uparrow s) * p),  \quad \text{EQUATION 1}$$

where $$f^{(1)} = \left(\frac{1}{K}\sum_{k=1}^{K} T_k^{-1}(g_k)\right)$$

$\uparrow$ s is the initial image, $g_k^{(n)} = (T_k(f^n)*h)\downarrow$ s is a simulated low resolution image, $T_k$ and $T_k^{-1}$ are motion vector transformation matrices, $\uparrow$ s represents up sampling, $\downarrow$ s represents down sampling, p represents high pass filtering, and h represents the point spread function.

$$e^{(n)} = \frac{1}{K}\sum_{k=1}^{K} \|g_k - g_k^{(n)}\|_2^2$$

is error minimization criteria.

With EQUATION 1, an image is updated by alternating between two stages: In a first stage, a lower resolution image is simulated from an estimated higher resolution image of a pervious iteration. In a second stage, the data is up-sampled and a difference between measured lower resolution image and estimated lower resolution images is added to the higher resolution image. The iterative process terminates when a difference between the estimated lower resolution images and the measured lower resolution images falls below a predetermined threshold, after lapse of a predetermined time, and/or other stopping criteria.

Other example of suitable super-resolution approaches are discussed in T. Huang and R. Tsai, "Multi-frame image restoration and registration," *Advances in Computer Vision and Image Processing*, vol. 1, pp. 2, 1984, N. Bose, H. Kim and H. Valenzuela, "Recursive implementation of total least squares algorithm for image reconstruction from noisy, undersampled multiframes," in *Acoustics, Speech, and Signal Processing*, 1993. ICASSP-93, 1993 *IEEE International Conference on*, 1993, pp. 269-272 vol. 5, L. Teodosio and W. Bender, "Salient video stills: Content and context preserved," in *Proceedings of the First ACM International Conference on Multimedia*, 1993, pp. 39-46, S. Peleg, D. Keren and L. Schweitzer, "Improving image resolution using subpixel motion," *Pattern Recog. Lett.*, vol. 5, pp. 223-226, 1987, M. Irani and S. Peleg, "Super resolution from image sequences," in *Pattern Recognition, 1990. Proceedings.*, 10*th International Conference on*, 1990, pp. 115-120 vol. 2, M. Irani and S. Peleg, "Improving resolution by image registration," *CVGIP: Graphical Models and Image Processing*, vol. 53, pp. 231-239, 1991, and M. C. Chiang and T. Boult, "Efficient super-resolution via image warping," *Image Vision Comput.*, vol. 18, pp. 761-771, 2000.

The image resolution enhancer 130 outputs one or more super-resolution images. As briefly discussed above, the foregoing allows for enhancing image resolution using multiple reconstructions of scanned periodically moving structure of interest (or multiple different views of a static structure) by leveraging a redundancy of the acquired data of several motion phases to generate super resolution volumetric data of the structure of interest and/or related structure. In one instance, this allows for better differentiation of certain structure (e.g., plaque components in cardiac scans), better visualization of certain structure (e.g., intra-stent structures in cardiac scans), better assessment of certain structure (e.g., coronary stenosis in cardiac scans), etc. As such, the foregoing facilitates calcium blooming artifact reduction, resolution enhancement, better calcium sizing, etc.

It is to be appreciated that one or more of the components 124, 126, 128, 130 and/or 132 can be part of a computing system 134 (as shown), the console 116, and/or other device. The computing system 134 can be local to the imaging system 100 or remote therefrom, for example, located in a separate room, a different facility, etc. Furthermore, one or more of the components 124, 126, 128, 130 and/or 132 can be implemented via a processor (micro-processor, controller, etc.) of the computing system 134 or other components which executes computer executable instructions encoded or embedded on computer readable storage medium such as physical memory or other non-transitory medium. Additionally or alternatively, the processor can execute at least one of the computer executable instructions carried by a carrier wave, a signal, or other transitory medium.

FIG. 2 illustrates an example method for improving the resolution of image data low dose and/or conventional dose image data. The following generally relates to generating super-resolution images.

It is to be appreciated that the ordering of the acts in the methods described herein is not limiting. As such, other orderings are contemplated herein. In addition, one or more acts may be omitted and/or one or more additional acts may be included.

At 202, multiple images representing different motion states of scanned periodically moving structure of a subject are obtained.

At 204, the periodically moving structure is segmented from the obtained multiple images.

At 206, inter-image motion is estimated for the multiple images. As discussed herein, the segmented data can be used to facilitate motion estimation.

At 208, at least a sub-set of the multiple images are registered based at least on the estimated motion. The segmented data can also be used to facilitate registration.

At 210, one or more super resolution images are generated based on the registered images and a PSF for the imaging system that generated the multiple images.

The methods described herein may be implemented via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

The foregoing system and/or method can be used in connection with several applications. For example, one application is plaque analysis. The prevention of acute coronary syndromes, such as myocardial infarction, is related to the presence of ruptured plaque and its composition. Where the reconstructed images processed by the computing system 134 include cardiac CT images, the computing system 134 can leverage the redundancy of the acquired data as described herein to restore, as described herein, a super resolution image that is more effective for plaque analysis. Another application is stenosis sizing. A limitation in accurate stenosis sizing is the blooming artifact resulting from hyper-dense objects such as calcified plaque. Calcium blooming results primarily from the limited spatial resolution of the CT system. This blurring effect causes an over-representation of the calcified regions and, correspondingly, under-estimation of the lumen area and the stenosis degree. The system and/or method described herein can reduce blooming artifact and allows better estimation of stenosis size by improving the image resolution.

Another application is the detection of in-stent re-stenosis. This procedure is problematic especially for narrow stents. The approach described herein allows for better visualization of small structures within the narrow stents. In general, any application that requires better resolution and has multiple available frames of a moving object with respect to the imaging location can be used to generate super-resolution images using the approach described herein. Furthermore, the approach described herein can be used with other resolution enhancement techniques such as iterative reconstruction/processing, etc. Moreover, the approach described herein can be combined with other imaging/analysis techniques such as spectral/multi-energy images/analysis, etc.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for generating higher resolution volumetric image data from lower resolution volumetric image data, comprising:
   receiving volumetric image data of a scanned subject, wherein the volumetric image data includes data representing a periodically moving structure of interest of the scanned subject, and wherein the volumetric image data covers multiple motion cycles of the periodically moving structure of interest;
   estimating inter-image motion between neighboring images of the received volumetric image data;
   registering the received volumetric image data based at least on the estimated inter-image motion; and
   generating the higher resolution volumetric image data based on the registered volumetric image data, a super resolution post-processing algorithm, and a point spread function of an imaging system that generated the volumetric image data,
   wherein the higher resolution volumetric image data has an image resolution that is greater than the lower resolution volumetric image data.

2. The method of claim 1, further comprising:
   segmenting the volumetric image data, thereby extracting the periodically moving structure of interest from the received volumetric image data;
   defining a sub-set of the volumetric image data based on the segmented image data; and
   at least one of, estimating the inter-image motion between the neighboring images of the sub-set of the volumetric image data or registering the received or segmented volumetric image data based at least on the sub-set of the volumetric image data.

3. The method of claim 1, further comprising:
   segmenting the volumetric image data, thereby extracting the periodically moving structure of interest from the received volumetric image data;
   identify a shape of the periodically moving structure of interest in the received volumetric image data based on the segmented volumetric image data; and
   estimating the inter-image motion between the neighboring images of the sub-set of the volumetric image data based on the identified shape.

4. The method of claim 1, further comprising:
   segmenting the volumetric image data, thereby extracting the periodically moving structure of interest from the received volumetric image data;
   identify a location of the periodically moving structure of interest in the received volumetric image data based on the segmented volumetric image data; and
   estimating the inter-image motion between the neighboring images of the sub-set of the volumetric image data based on the identified location of periodically moving structure of interest.

5. The method of claim 1, further comprising:
   segmenting the volumetric image data, thereby extracting the periodically moving structure of interest from the received volumetric image data;
   determining a set of weights for visually enhancing the periodically moving structure based on segmented volumetric image data; and
   registering the volumetric image data based on the weights.

6. The method of claim 1, further comprising:
   segmenting the volumetric image data, thereby extracting the periodically moving structure of interest from the received volumetric image data;

determining a mask to mask portions of the volumetric image data to visually enhance the periodically moving structure based on segmented volumetric image data; and registering the volumetric image data using the mask.

7. The method of claim 1, further comprising:

defining a sub-set of the volumetric image data based on the estimated motion, wherein the sub-set only includes image data satisfying a predetermined inter-image motion threshold range; and registering the sub-set of the volumetric image data based on the estimated motion.

8. The method of claim 1, further comprising:

employing the point spread function to compensate for blur introduced into the volumetric image data by the imaging system.

9. The method of claim 1, wherein the structure is an anatomical vessel and the motion cycle is a cardiac motion cycle.

10. The method of claim 1, wherein the higher resolution volumetric image data is generated by alternating between a first stage in which lower resolution volumetric image data is simulated from estimated higher resolution volumetric image data of a pervious iteration, and a second stage in which the simulated lower resolution volumetric image data is up-sampled and a difference between measured lower resolution image data and the simulated lower resolution image data is added to the higher resolution volumetric image data.

11. A computing system, which receives volumetric image data of a scanned subject, wherein the volumetric image data includes data representing a periodically moving structure of interest of the scanned subject, and wherein the volumetric image data covers multiple motion cycles of the periodically moving structure of interest, the computing system, comprising:

a motion estimator that estimates an inter-image motion between neighboring images of the received volumetric image data;

a registration component registering the received volumetric image data based at least on the estimated inter-image motion; and an image resolution enhancer that generates super resolution volumetric image data based on the registered volumetric image data and a point spread function of an imaging system that generated the volumetric image data, wherein the super resolution image data for the periodically moving structure of interest has an image resolution that is greater than a resolution of the individual images of the received volumetric image data.

12. The system of claim 11, further comprising:

a region of interest segmentor that segments the volumetric image data, thereby extracting the periodically moving structure of interest from the received volumetric image data, wherein the motion estimator employs the segmented volumetric image data to define a sub-set of the volumetric image data.

13. The system of claim 12, wherein the motion estimator estimates the inter-image motion between the neighboring images of the sub-set of the volumetric image data.

14. The system of claim 12, wherein the motion estimator identifies a shape of the periodically moving structure of interest in the received volumetric image data based on the segmented volumetric image data and estimates the inter-image motion between the neighboring images of the sub-set of the volumetric image data based on the identified shape.

15. The system of claim 12, wherein the motion estimator identifies a location of the periodically moving structure of interest in the received volumetric image data based on the segmented volumetric image data and estimates the inter-image motion between the neighboring images of the sub-set of the volumetric image data based on the identified location of the periodically moving structure of interest.

16. The system of claim 12, wherein the registration component registers the received volumetric image data or segmented volumetric image data based at least on the sub-set of the volumetric image data.

17. The system of claim 12, wherein the registration component weights the periodically data representing the moving structure of interest based on the sub-set of the volumetric image data.

18. The system of claim 12, wherein the registration component mask portions of the volumetric image data based on the sub-set of the volumetric image data.

19. The system of claim 12, wherein the registration component only register images of the sub-set of the volumetric image data that satisfy a predetermined inter-image motion threshold range.

20. The system of claim 11, wherein the image resolution enhancer generates the super resolution volumetric image based on:

$$f^{(n+1)} = f^{(n)} + \frac{1}{K}\sum_{k=1}^{K} T_k^{-1}(((g_k - g_k^{(n)})\uparrow s) * p),$$

where $$f^{(1)} = \left(\frac{1}{K}\sum_{k=1}^{K} T_k^{-1}(g_k)\right)\uparrow s$$

is initial volumetric image data, $$g_k^{(n)} = (T_k(f^n) * h)\downarrow s$$

is an image simulated from an estimated higher resolution image of a pervious iteration, $T_k$ and $T_k^{-1}$ are motion vector transformation matrices, $\uparrow s$ represents up sampling, $\downarrow s$ represents down sampling, p represents high pass filtering, and h represents the point spread function.

* * * * *